United States Patent
Steiner et al.

(10) Patent No.: US 10,601,609 B2
(45) Date of Patent: Mar. 24, 2020

(54) METHOD TO IMPROVE AVAILABILITY OF REAL-TIME COMPUTER NETWORKS

(71) Applicant: TTTech Computertechnik AG, Vienna (AT)

(72) Inventors: Wilfried Steiner, Vienna (AT); Günther Bauer, Vienna (AT); Mirko Jakovljevic, Vienna (AT); Arjan Geven, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 0 days.

(21) Appl. No.: 16/153,923

(22) Filed: Oct. 8, 2018

(65) Prior Publication Data

US 2019/0109728 A1 Apr. 11, 2019

(30) Foreign Application Priority Data

Oct. 9, 2017 (EP) .................................... 17195409

(51) Int. Cl.
*H04L 12/44* (2006.01)
*H04L 29/06* (2006.01)
(Continued)

(52) U.S. Cl.
CPC ................ *H04L 12/44* (2013.01); *H04L 5/14* (2013.01); *H04L 7/0083* (2013.01); *H04L 12/40* (2013.01);
(Continued)

(58) Field of Classification Search
CPC ........... H04Q 11/0067; H04Q 11/0066; H04Q 2011/0015; H04Q 2011/0064;
(Continued)

(56) References Cited

PUBLICATIONS

Steiner et al. "Chapter 8—Time-Triggered Internet"—2011 (Year: 2011).*

(Continued)

*Primary Examiner* — Quan M Hua
(74) *Attorney, Agent, or Firm* — Eversheds Sutherland (US) LLP

(57) ABSTRACT

A method for transmitting real-time messages in a computer network (100), in particular real-time computer network, wherein said network comprises two or more computing nodes (21, 22, 23, 24, 25, 26) and one or more star couplers (1, 2, 3, 4), wherein said nodes are interconnected via at least one star coupler, wherein each node is connected to at least one star coupler via at least one of the communication links (50), and wherein the nodes exchange messages (M1, M2) with one another and with the at least one star coupler, and wherein star couplers, which are synchronized to a global time base (C), transmit a first non-empty set (SSET) of real-time messages according to a synchronized communication paradigm, and/or wherein computing nodes, which are synchronized to the global time base, transmit said first non-empty set of real-time messages according to the synchronized communication paradigm, wherein a star coupler, which is not synchronized to a global time base, and/or a computing node, which is not synchronized to a global time base, transmits a second non-empty subset (CSET) of said first non-empty subset of real-time messages according to an unsynchronized communication paradigm and stops the transmission of said second non-empty subset of real-time messages according to the synchronized communication paradigm.

14 Claims, 5 Drawing Sheets

(51) Int. Cl.
    *H04L 5/14*     (2006.01)
    *H04L 12/40*     (2006.01)
    *H04L 7/00*     (2006.01)
    *H04L 12/725*     (2013.01)
    *H04L 12/931*     (2013.01)

(52) U.S. Cl.
    CPC ...... *H04L 45/3065* (2013.01); *H04L 65/1003* (2013.01); *H04L 49/351* (2013.01); *H04L 69/26* (2013.01); *H04L 2012/4028* (2013.01); *H04L 2012/445* (2013.01)

(58) Field of Classification Search
    CPC ............... H04B 10/27; H04B 1/707; H04B 2201/70715; H04J 14/086; H04J 3/14; H04J 3/1694; H04J 3/0655; H04J 13/00; H04J 14/005; H04J 3/0658; H04L 12/44; H04L 12/6402; H04L 2012/40241; H04L 47/15; H04L 47/2416; H04L 47/2433; H04W 72/0446
See application file for complete search history.

(56) References Cited

PUBLICATIONS

European Search Report for European Application No. 17195409.2, dated Mar. 23, 2018 (12 pages).
Steiner, W. et al., Time-Triggered Communication, Chapter 8—Time Triggered Ethernet, pp. 181-220, CRC Press (2011).
Aeronautical Radio, Inc. (Airlines Electronic Engineering Committee), Aircraft Data Network Part 7 Avionics Full Duplex Switched Ethernet (AFDX) Network, ARINC Specification 664P7, published Jun. 27, 2005 (145 pages).
SAE International, Time-Triggered Ethernet, Aerospace Standard AS6802, issued Nov. 2011 (108 pages).
Time-Sensitive Networking Task Group, IEEE 802, http://www.ieee802.org/1/pages/tsn.html, last modified on May 3, 2017 (4 pages).
Time Sensitive Networking Task Group of IEEE 802.1, Draft Standard for Local and Metropolitan Area Networks—Bridges and Bridged Networks—Amendment: Enhancements for Scheduled Traffic, IEEE P802.1Qbv/D3.1, issued Sep. 22, 2015 (52 pages).

* cited by examiner

METHOD TO IMPROVE AVAILABILITY OF REAL-TIME COMPUTER NETWORKS

CROSS-REFERENCE TO RELATED APPLICATIONS

This application claims priority to European Patent Application No. 17195409.2, filed Oct. 9, 2017, which is incorporated herein by reference.

DESCRIPTION

The invention relates to a method for transmitting real-time messages in a computer network, in particular real-time computer network, wherein said computer network comprises two or more computing nodes and one or more star couplers, wherein said computing nodes are interconnected via at least one star coupler, wherein each computing node is connected to at least one star coupler via at least one of the communication links, and wherein the computing nodes exchange messages with one another and with the at least one star coupler, and wherein star couplers, which are synchronized to a global time base, transmit a first non-empty set of real-time messages according to a synchronized communication paradigm, and/or wherein computing nodes, which are synchronized to a or the global time base, transmit said first non-empty set of real-time messages according to a or the synchronized communication paradigm.

Furthermore, the invention relates to a computer network, in particular real-time computer network, for transmitting real-time messages, wherein said computer network comprises two or more computing nodes and one or more star couplers, wherein said computing nodes are interconnected via at least one star coupler, wherein each computing node is connected to at least one star coupler via at least one of the communication links, and wherein the computing nodes exchange messages with one another and with the at least one star coupler, and wherein the star couplers are configured in such a way, that a star coupler which is synchronized to a global time base, transmits a first non-empty set of real-time messages according to a synchronized communication paradigm, and/or wherein the computing nodes are configured in such a way, that a computing node which is synchronized to a or the global time base transmits said first non-empty set of real-time messages according to a or the synchronized communication paradigm.

The invention is in the area of computer systems, in particular in the area of real-time computing systems. Typically, a network, in particular a computer network, is a part of a computing system. The computing system comprises a number of components, e.g. processors and/or computing nodes, which are connected by the computer network.

The invention relates to a method to improve availability of computer networks, wherein said computer network comprises two or more computing nodes, which computing nodes are interconnected via one, two, or more star couplers, wherein each computing node is connected to a network star coupler via at least one communications link and wherein the computing nodes use messages to distribute information within the network and exchange said messages with one another and with the one or more star couplers.

In real-time computing systems, the system's functions need not only produce the correct output—as it is sufficient in regular office computer systems—but need to produce this output also within defined and often very tight temporal bounds. The nodes of a real-time computing system are typically equipped with local clocks capable of measuring the progress of real-time. In real-time systems and corresponding real-time networks, the transfer time of messages must be upper-bounded to provide guarantees on the latency and jitter of the communication between said computing nodes in the network. Two ways to achieve bounded transfer time are:

A) Communication according to the unsynchronized communication paradigm where knowledge about the communication behaviour in the network is used to calculate upper-bounds that are ensured by shaping and policing of the communication traffic, resulting in Rate Constrained Communication, and B) Communication according to the synchronized communication paradigm with a communication schedule that is defined a priori and executed during runtime, and which bounds the latency and jitter of each message transfer, as in Time-Triggered Communication.

Ensuring a bounded message transfer time using unsynchronized communication paradigm is achieved by limiting the amounts of real-time data that a computing node in a network is allowed to send per time unit (data rate). These amounts (expressed for example with the maximal length of the sent frames and the minimum interval between two consecutive frames) are specified during design time, taking into account application requirements, available bandwidth, and the number of computing nodes and star couplers in the network. Using the specification, the bounds on the message transfer time are calculated and their enforcement is ensured in said computing nodes and star couplers during runtime. A concrete implementation of the unsynchronized communication paradigm with bounded transfer time is the Avionics Full-Duplex Switched Ethernet (AFDX) [1] communication protocol. As the logical data stream, AFDX uses the concept of a virtual link, where a dedicated portion of the physical network bandwidth is allocated to each virtual link. A virtual link is a logical unidirectional connection between one sending computing node and one or more receiving computing nodes and is uniquely identified with the virtual link ID (specified in the MAC destination address). Each star coupler in the network is configured to know about the characteristics of virtual links and ensures that the maximum data rate allowed for particular virtual link is kept (rate constrained).

In the synchronized communication paradigm, computing nodes and star couplers send messages according to a communication schedule. The synchronized communication paradigm assumes the availability of a shared global time base across said computing nodes and star couplers, which execute the scheduled transfer according to said shared global time base. Each node in the network comprises at least a subset of the communication schedule, called the "local schedule", which defines a point in time to transmit a particular message.

This local schedule is derived from the communication schedule (or is a part of it). The communication schedule is typically created in such a way that the messages that are scheduled in the communication schedule are transported through the network with a duration that is as constant as possible. Bandwidth not used for synchronized communication can be used for unsynchronized communication (e.g., rate constrained communication as in AFDX standard, or best effort traffic without defined bounds or guarantees). There are two prominent examples of Ethernet-based real-time networks that implement the synchronized communication paradigm: TTEthernet [2] and IEEE Time Sensitive Networking (TSN) [3] protocols. The TTEthernet protocol according to standard SAE AS6802 uses the term "end system" as a synonym for computing nodes and all messages communicated in the network are Ethernet messages. Both standards specify mechanisms for the time synchronization including the detection of the unsynchronized state (losing the synchronization to the global time base) in a computing device or a star coupler. In a TTEthernet network, each star coupler contains the relevant part of the communication schedule in order to take policing and forwarding decisions. TSN implements a synchronized communication paradigm and ensures a bounded maximum latency for scheduled traffic through switched networks by using the concepts of queues and time aware shapers defined in IEEE 802.1Qbv standard [4]. For each outbound port on the star coupler one or several queues are realized to temporarily store messages for serialization. The longer a message is stored in such a queue, the longer is its latency. When a queue is filled completely, the next incoming message will be dropped. If only one queue is used, a FIFO principle is typically used to ensure that the frame that has resided in the queue for the longest period of time will be transmitted first. In case of safety-critical networks, multiple queues are realized to separate critical and non-critical messages and to give priority to critical messages. Time-aware shapers control the flow of queued traffic from a TSN switch (star coupler) so that the transmission of messages from queues is executed in scheduled time windows. Other, non-real time queues will typically be blocked from transmission during these time windows, removing the chance of scheduled traffic being impeded by non-scheduled traffic. This means that the message latency through a network of TSN-enabled components can be guaranteed.

In some real-time networks, for example in railway backbone networks, during coupling and uncoupling of trains, the train-wide communication will be degraded for certain periods of time (e.g., for modifications of train compositions). During the coupling of trains, the clocks in the system might not yet be synchronized to the global time base, but basic, unsynchronized communication is available. In some situations, a global time base is not available because the nodes in the network are not (yet) synchronized. In the synchronized communication paradigm, this inhibits the transfer of synchronized messages according to the predefined schedule. This implies additional complexity in software to continue the sending of time-bounded messages during such degraded operation mode and requires the addition of complex detection and handling mechanisms or the use of mechanisms that do not rely on time-bounded communication.

It is an object of this invention to enable real-time, guaranteed communication for at least a part of real-time messages originally assigned to the synchronized communication paradigm even in such cases, where the synchronization to a global time base is not available.

This object is achieved with a method described above, characterized in that a star coupler, which is not synchronized to a global time base, and/or a computing node, which is not synchronized to a global time base, starts the transmission of a second non-empty subset of said first non-empty subset of real-time messages according to an unsynchronized communication paradigm and stops the transmission of said second non-empty subset of real-time messages according to the synchronized communication paradigm.

Furthermore this object is achieved with a network described above, wherein the star couplers are furthermore configured in such a way, that a star coupler, which is not synchronized to a global time base, starts the transmission of a second non-empty subset of said first non-empty subset of real-time messages according to an unsynchronized communication paradigm and stops the transmission of said second non-empty subset of real-time messages according to the synchronized communication paradigm, and/or wherein the computing nodes are furthermore configured in such a way that a computing node, which is not synchronized to a global time base, starts the transmission of a second non-empty subset of said first non-empty subset of real-time messages according to an or the unsynchronized communication paradigm and stops the transmission of said second non-empty subset of real-time messages according to the synchronized communication paradigm.

Messages of a so-called first subset are configured to be transmitted using a synchronized communication paradigm. According to the invention a so-called second subset of, in particular critical, real-time messages, which second subset is a subset of the first subset, is configured for transmission across the network with defined time guarantee, even if the global time base C is not available. Star couplers and computing nodes are configured to transfer said second subset of, in particular critical, real-time messages, originally configured for synchronized communication paradigm according to the unsynchronized communication paradigm (e.g., as rate-constrained messages) when the star coupler(s) and computing nodes are not synchronized to the shared global time base. Other messages that don't belong to said second subset are either sent with low priority or even discarded.

In computer networks, in which all critical real-time messages are transmitted using synchronized communication paradigm, communication is not possible during the time period during which the global time base is not available. Using the method from this invention, critical real-time messages are transmitted even during the time periods, in which the global time is not available. This increases overall time in which networks are able to transmit critical messages and thus increase the overall availability of such computer networks.

In some embodiments of this invention, the method from this invention is realized using message types wherein each real-time message is characterized by its type. Network devices, such as star couplers and/or computing nodes comprise a configuration based on message types that specifies which of the messages will be transmitted using which communication paradigm. It is specified that messages characterized by some defined types are sent using synchronized communication paradigm, if a global time base is available (synchronization exists), and using unsynchronized communication paradigm if the global time base is not available (synchronization lost). In essence, star coupler and end devices change the communication paradigm of messages characterized by some defined message types in the case of lost synchronization. Message types are uniquely identified by a unique identifier, preferably transported in the message itself. For example in Ethernet, the MAC (media access control) destination address can be used to identify the message type. In general, some unique combination of bits in Ethernet, IP and UDP headers can be used as a unique type identifier. Ethernet's EtherType does not necessarily correspond to the message type in this invention. In some networks, message types can be related to (logical) data streams (both in synchronized as well as unsynchronized communication paradigm). A stream of messages is a set of messages belonging to a same message type that are sent one after another (potentially with some minimum temporal interval between two consecutive messages). In some embodiments that utilize TTEthernet standard, message types correspond to virtual links. In another embodiments that utilize Time Sensitive Networking (TSN) Standards, e.g., IEEE 802.1Qbv, message types correspond to TSN streams.

In real-time communication according to the unsynchronized communication paradigm, the network configuration (e.g., upper bounds) is computed according to the requirements and the available bandwidth. Said network configuration may contain upper bounds and maximal data rates per message type. Star couplers and computing nodes use this configuration and execute traffic policing and shaping according to it. In this invention, said subset of critical, real-time messages, originally configured for the synchronized communication paradigm, can be sent using the unsynchronized paradigm, so that the overall amount of data to be sent using unsynchronized paradigm can change and a modified network configuration (called, for example, "degraded network configuration") may be needed. In one embodiment of this invention, if not synchronized to a global time base, star couplers and computing devices load and execute said new network configuration, where the network constraints (e.g., upper bounds) for said subset of critical real-time messages, originally configured for the synchronized communication paradigm, is already considered.

Advantageous embodiments of the method and network according to the invention are described in the following:

Real-time messages may be characterized by message types, wherein said message types are uniquely identified by unique identifiers, preferably with a unique combination of bits in the header of said real-time message.

A star coupler may change the type of a received message belonging to said second subset of messages to a predefined message types, before transmitting said real-time messages, according to a predefined mapping, if said at least one star coupler is not synchronized to a global time base.

A unique subset of said predefined message types may be assigned to a star coupler, in particular to each star coupler, and to a computing node, in particular to each computing node, and wherein each of said star couplers and each of said computing nodes, to which a unique subset is assigned changes the type of received messages to said predefined message types, preferably according to a predefined mapping.

Star couplers and computing nodes may have knowledge of said predefined mapping for other star couplers in the network and computing nodes and may use this knowledge to detect which star couplers and/or computing nodes have changed the type of the message to one of said types and thus has lost the synchronization to the global time base.

The synchronized communication paradigm may be realized
 using the time-triggered traffic class in TTEthernet standard, in accordance with an IEEE 802.3 standard or a standard based thereon or following on therefrom, and/or
 using the IEEE 802.1Qbv standard.

The unsynchronized communication paradigm may be realized using
 IEEE 802.1Qav standard, and/or
 using Avionics Full-Duplex Switched Ethernet (AFDX) standard, and/or
 using non-bounded traffic defined in IEEE 802.3 standard.

In some embodiments of this invention, star couplers are configured to change the message types prior to transmitting said message if said star couplers are not synchronized to a global time base, and the message belong to one of the said types originally configured for synchronized communication (called for example, "Critical Message Types"). In some embodiments, these message types are specifically defined as the types to be sent in the case of lost synchronization (called for example, "degraded message type"), such that other nodes in the network will become aware that synchronization in one of the star couplers is lost (after receiving the message with this type).

Furthermore, each star coupler in the network may have a unique set of types (called for example "degraded assigned message type"), assigned exclusively to each star coupler and defined in a mapping MAP, so that other star couplers will get aware (after receiving the message characterized by one of said types), which node in the network is currently not synchronized to the global time base. Star couplers and end-devices are aware of said message type mapping MAP for other star couplers and computing nodes in the network, and use it to detect which of said star couplers and end devices has changed the type of the message and has lost the synchronization to the global time base.

In the following, in order to further demonstrate the present invention, illustrative and non-restrictive embodiments are discussed, as shown in the drawings, which show:

FIG. 1 an example of the network related to this invention,

FIG. 2 an example of the network related to this invention where some network nodes are not synchronized to the global time base, FIG. 3 sets of real-time messages, FIG. 4 an example of message transmissions, FIG. 5 an example of message transmissions with message types, FIG. 6 an example of message transmissions with message types, including the changing of massage types, FIG. 7 an example of message transmissions with message types, including the changing of massage types such that each network devices has assigned message types, FIG. 8 an example of a message frame, where a MAC header is used for identifying the message type, FIG. 9 an example of a message frame, where IP/UDP headers are used for identifying the message type, FIG. 10 an example of a message frame, where MAC and IP/UDP headers are used for identifying the message type, FIG. 11 an example of a mapping MAP of message types to network devices, FIG. 12 a (simplified) example of a switch schedule S based on Virtual Links, and FIG. 13 a (simplified) example of a switch schedule, similar to FIG. 12.

FIG. 1 shows an example of a computer network 100 comprising four star couplers 1, 2, 3, 4 and six computing nodes 21, 22, 23, 24, 25, 26 connected via bidirectional communication links 50. Each star coupler and computing node comprises a local clock C. All local clocks C of said computing nodes and star couplers are synchronized to a global time base in this figure (represented in the figure by S).

Message transfer in said network can occur, for example, using the time-triggered traffic class in TTEthernet standard, and/or the IEEE 802.1Qbv standard for synchronized communication and/or IEEE 802.1Qav standard, and/or Avionics Full-Duplex Switched Ethernet (AFDX) standard, and/or non-bounded traffic defined in IEEE 802.3 standard for unsynchronized communication.

FIG. 2 shows an example of a computer network similar to the one shown in FIG. 1, where the clocks C of the star coupler 2 and the computing device 23 are not synchronized to the global time base. In this case, the star coupler 2 sends a subset of messages originally configured for synchronized communication paradigm using the unsynchronized communication paradigm.

FIG. 3 depicts a set of messages to be transmitted over a network separated in three subsets: a subset BE of messages being sent using unsynchronized best effort paradigm without any bounds or guarantees, a subset USET of messages being sent using unsynchronized rate constrained paradigm (examples are messages UM1 and UM2), and a subset SSET of messages to be sent using synchronized communication paradigm (examples are message types SM1, SM2, SM3, SM4 and SM5). In the case of lost synchronization (as shown on the right side of the figure), messages belonging to the subset CSET (examples are messages SM3, SM4 and SM5) of the subset SSET originally configured to be transferred using synchronized communication paradigm are sent using unsynchronized communication paradigm (for example, said subset CSET comprises messages SM3, SM4 and SM5). Messages SM1 and SM2 are not sent at all in the case of lost synchronization. So in the case of lost synchronization, no messages are sent using synchronized communication paradigm (the subset of messages sent using synchronized communication paradigm thus the subset SSET is empty).

FIG. 4 shows an example of a sequence of message transmissions in the case where all network nodes are synchronized to the global time base (upper part of the figure), and the case where the star coupler Switch 2 has lost synchronization to the global time base (lower part of the figure). Message M1 belongs to a first subset of a set of all messages, configured for the transmission according to an unsynchronized communication paradigm. Message M2 belongs to a second subset of said set of all messages, configured to be transmitted according to synchronized communication paradigm if the global time base is available, and according to unsynchronized communication paradigm if the global time base is not available. Sender and star couplers Switch 1 and Switch 2 are configured to send messages from said second subset at predefined points in time t1, t2 and t3. In this example, star coupler Switch 2 loses the synchronization to the global time base (depicted in the lower part of the figure) and sends the message M2 with high priority using unsynchronized communication paradigm. Different than in the previous case depicted in the upper part of the figure, Switch 2 sends the message M2 prior to the message M1.

FIG. 5 shows an example of the sequence of message transmissions similar to FIG. 4, with the realization of the invention based on message types. The figure shows an example where all network nodes are synchronized to the global time base (upper part of the figure), and the case where the star coupler Switch 2 has lost the synchronization to the global time base (lower part of the figure). There are two types of messages transmitted in this example: messages with the type T1 (e.g., M1) are configured, in particular according to the type T1, to be sent using unsynchronized communication paradigm, and messages with the type T2 (e.g., message M2) are configured, in particular according to the type T2, to be sent using synchronized communication paradigm if global time base is available, and to be sent using unsynchronized communication paradigm if global time base is not available. Sender and star couplers Switch 1 and Switch 2 are configured to send messages with the type T2 at the predefined points in time t1, t2 and t3. In this example, star coupler Switch 2 loses the synchronization to the global time base (depicted in the lower part of the figure) and sends the message M2 with the type T2 with high priority using unsynchronized communication paradigm (prior to the message M1, due to higher priority).

FIG. 6 shows an example of a sequence message transmission similar to the one in FIG. 5. In this figure, however, star coupler Switch 2 changes the type of the message M2 from the type T2 to type T20, prior to sending the message, where the type T20 is specifically defined as the type to be sent in the case of lost synchronization (called, for example, "degraded message type"), if said star coupler loses the synchronization to the global time base. Such other nodes in the network will get aware that synchronization in one of the star couplers is lost (after receiving the message with the type T20).

FIG. 7 shows an example of the sequence message transmission similar to the one in FIG. 6. This figure, however, shows the case where each star coupler in the network has assigned an unique set of message types T101, T103, T10n, . . . , (called for example "degraded assigned message type"), assigned exclusively to each star coupler and defined in a mapping MAP. Star couplers change the type of a message prior to sending the message, according to this mapping, if said star couplers lose the synchronization to the global time base. So other star couplers will become aware (after receiving the message characterized by one of said types), which node in the network is currently not synchronized to the global time base. In this figure, star coupler Switch 2 changes the type the message M2 from T2 to T202 in the case of lost synchronization to the global time base.

Figure 1:
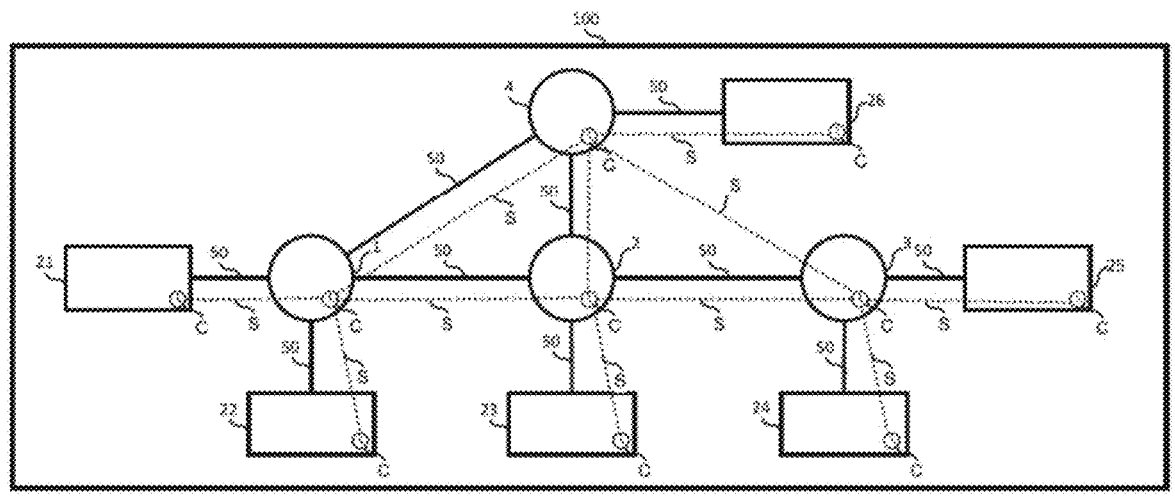
Figure 2:
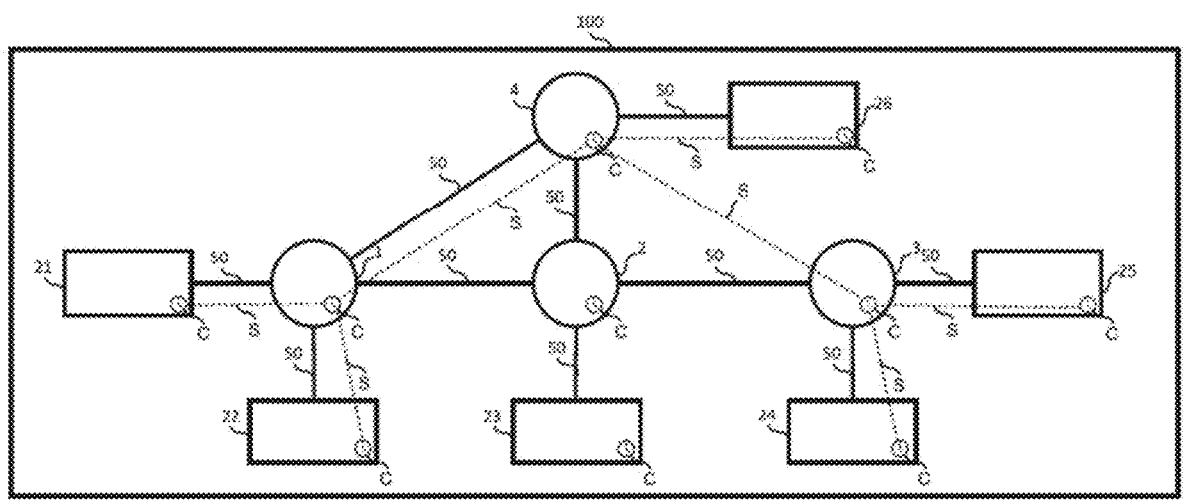
Figure 3:
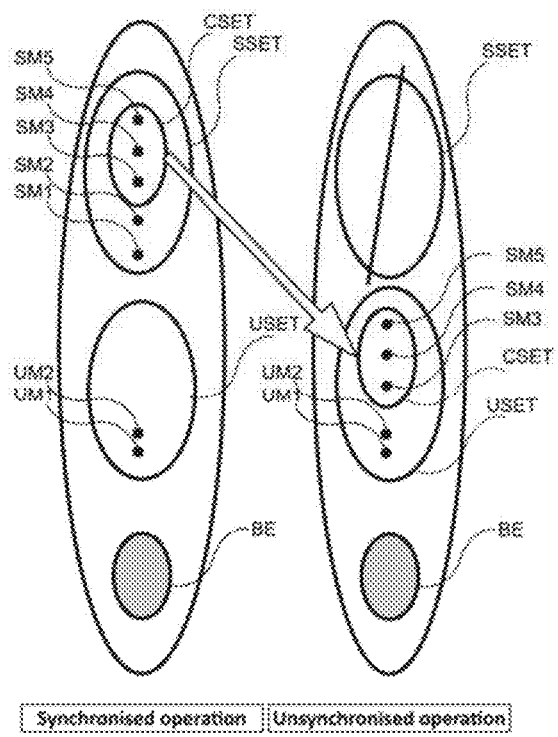
Figure 4:
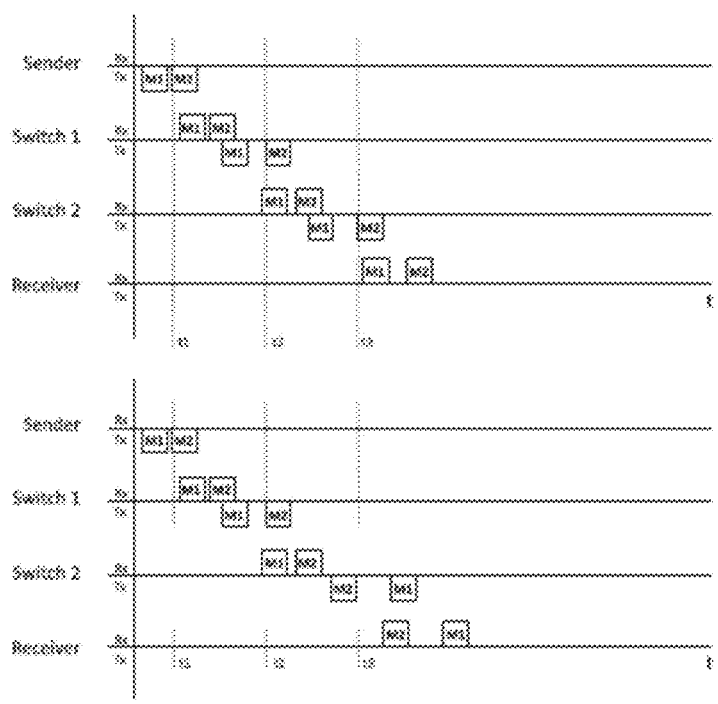
Figure 5:
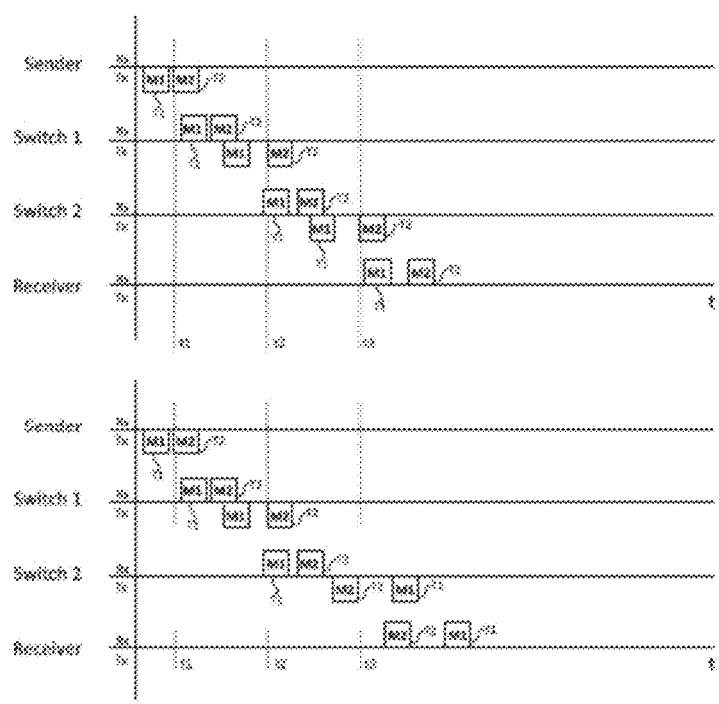
Figure 6:
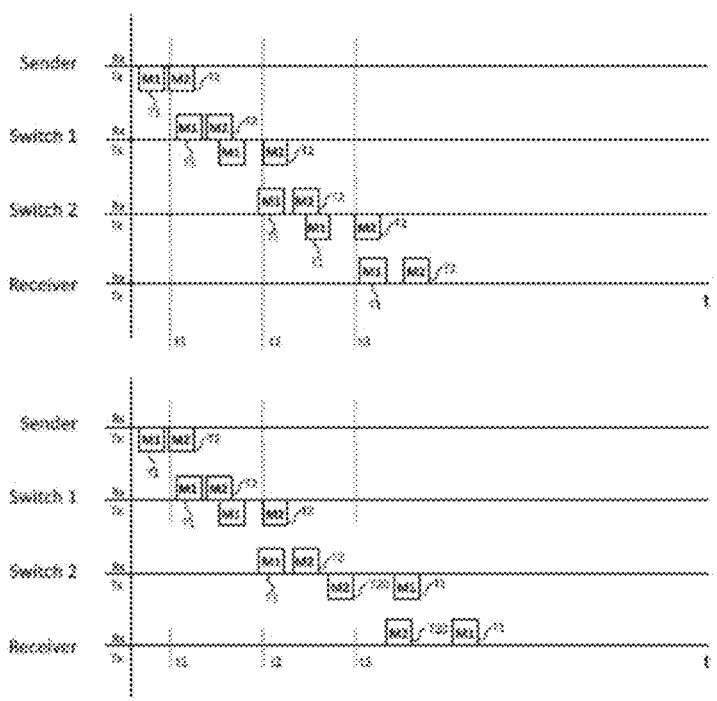
Figure 7:
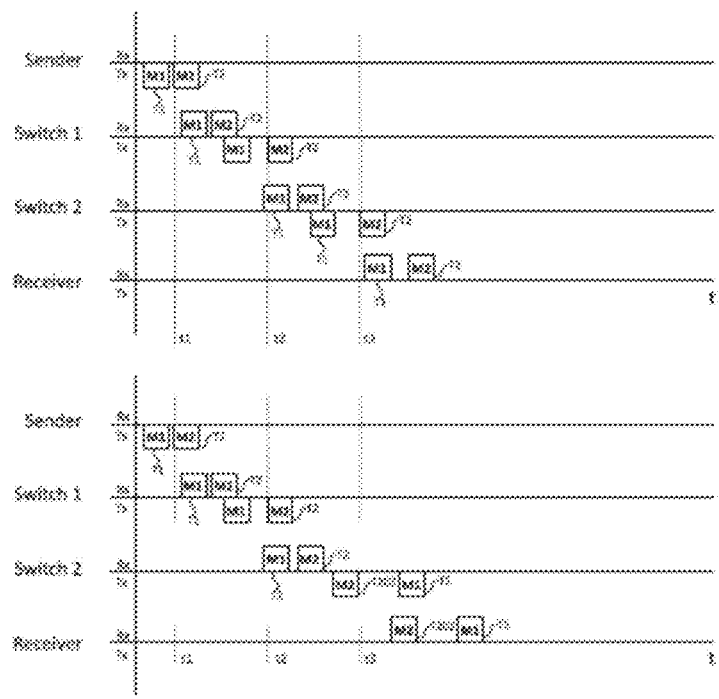
Figure 8:
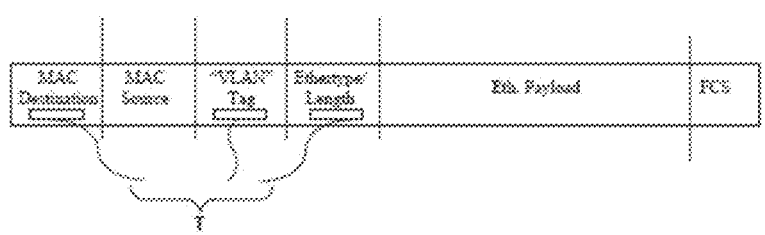
FIG. 8 shows an Ethernet frame, where a combination of MAC addresses, VLAN Tag and EtherType can be used to identify the message type T.
Figure 9:
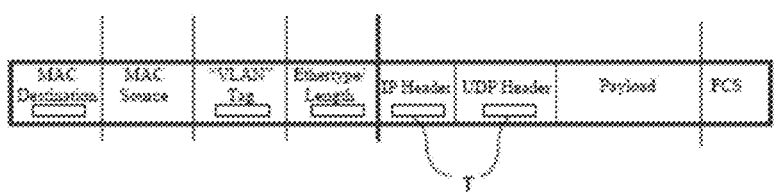
FIG. 9 shows an Ethernet frame similar to the one in FIG. 8, where the content of the Ethernet payload is an IP/UDP packet and a combination of IP and UPD header can be used to identify the message type T.
Figures 10, 11, 12, 13:
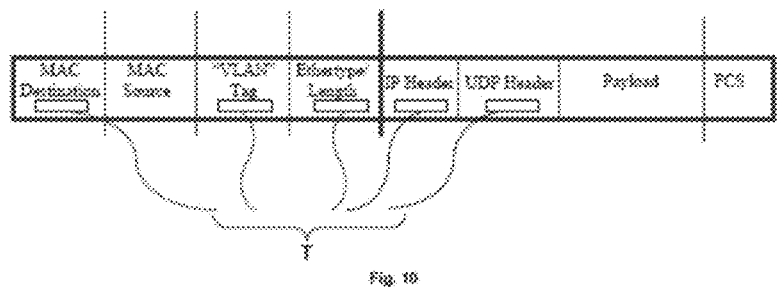
FIG. 10 shows an Ethernet frame similar to the one in FIG. 8 and FIG. 9, where the content of the Ethernet payload is an IP/UDP packet and a combination of MAC addresses, VLAN Tag and EtherType, IP and UPD header can be used to identify the message type T.

FIG. 11 shows an example of a mapping MAP of message types to network devices where each network device SC1, SC2, . . . SCn, has a unique set of types to be used to modify the messages types 1, 2, . . . , n originally configured for synchronized communication paradigm to the new types 101, 102, . . . , 10n, 201, 202, . . . , 20n, k01, k02, ..., k0n, when said network devices are not synchronized to the shared global time base. In such way, other star couplers will get aware (after receiving the message characterized by one of said types), which node in the network is currently not synchronized to the global time base.

FIG. 12 shows a (simplified) example of a switch schedule S based on Virtual Links to be executed according to the state of the art TTEthemet (Virtual Link is a possible implementation of the message type). Messages received with VLID 1 on Port 1 will be forwarded by the switch on ports 4 and 8.

FIG. 13 shows a (simplified) example of a switch schedule, similar to FIG. 12, where, according to this invention, messages of the types 1 and 2 (identified with VLID) will be changed to the types 4 and 5 (called DegradedVL in this figure), if sad switch is currently not synchronized to the global time base.

REFERENCES

[1] INC Aronautical Radio. ARINC 664, P7: Avionics Full Duplex Switched Ethernet (AFDX) Network. ARINC Specification 664 Part 7, June 2005.

[2] AS6802: Time-Triggered Ethernet, http://standards.sae.org/as6802/

[3] IEEE 802.1—Time Sensitive Networking Task Group," http://www.ieee802.org/1/pages/tsn.html, 3 Nov. 2014

[4] "IEEE 802.1Qbv—Enhancements for Scheduled Traffic," http://www.ieee802.org/1/pages/802.1bv.html, Draft, 7 Oct. 2015.

That which is claimed is:

1. A method for transmitting real-time messages in a real-time computer network,
wherein the real-time computer network comprises two or more computing nodes (21, 22, 23, 24, 25, 26) and one or more star couplers (1, 2, 3, 4), wherein the two or more computing nodes (21, 22, 23, 24, 25, 26) are interconnected via at least one star coupler (1, 2, 3, 4), wherein each computing node (21, 22, 23, 24, 25, 26) is connected to the at least one star coupler (1, 2, 3, 4) via at least one communication link (50), and wherein the two or more computing nodes exchange messages (M1, M2) with one another and with the at least one star coupler, and
wherein star couplers, which are synchronized to a global time base (C), transmit a first non-empty set (SSET) of real-time messages according to a synchronized communication paradigm, and/or
wherein computing nodes (21, 22, 23, 24, 25, 26), which are synchronized to a or the global time base (C), transmit said first non-empty set of real-time (SSET) messages according to a or the synchronized communication paradigm, wherein:
a star coupler (1, 2, 3, 4), which is not synchronized to a global time base (C), and/or a computing node (21, 22, 23, 24, 25, 26), which is not synchronized to a global time base (C), starts the transmission of a second non-empty subset (CSET) of said first non-empty subset (SSET) of real-time messages according to an unsynchronized communication paradigm and stops the transmission of said second non-empty subset (CSET) of real-time messages according to the synchronized communication paradigm.

2. The method according to claim 1, wherein real-time messages are characterized by message types (T), wherein said message types are uniquely identified by unique identifiers, with a unique combination of bits in the header of said real-time message.

3. The method according to claim 2, wherein a star coupler changes the type (T1, T2) of a received message (M1, M2) belonging to said second subset (CSET) of messages to a predefined message types (T20), before transmitting said real-time messages, according to a predefined mapping, if said at least one star coupler is not synchronized to a global time base (C).

4. The method according to claim 3, wherein a unique subset of said predefined message types (T101, T102, T1 . . . n, T201, T202, T2 . . . n, Tk01, Tk02, Tk0n) is assigned to each star coupler, and to each computing node, and wherein each of said star couplers (1, 2, 3, 4) and each of said computing nodes (21, 22, 23, 24, 25, 26), to which a unique subset is assigned changes the type of received messages to said predefined message types (T101, T102, T1 . . . n, T201, T202, T2 . . . n, Tk01, Tk02, Tk0n), preferably according to a predefined mapping (MAP).

5. The method according to claim 4, wherein star couplers and computing nodes have knowledge of said predefined mapping (MAP) for other star couplers in the network (1, 2, 3, 4) and computing nodes (21, 22, 23, 24, 25, 26) and use this knowledge to detect which star couplers and/or computing nodes have changed the type of the message to one of said types (T101, T102, T1 . . . n, T201, T202, T2 . . . n, Tk01, Tk02, Tk0n) and thus has lost the synchronization to the global time base.

6. The method according to claim 1, wherein the synchronized communication paradigm is realized using:
the time-triggered traffic class in TTEthernet standard, in accordance with an IEEE 802.3 standard or a standard based thereon or following on therefrom, and/or the IEEE 802.1Qbv standard.

7. The method according to claim 1, wherein the unsynchronized communication paradigm is realized using:
IEEE 802.1Qav standard, and/or
Avionics Full-Duplex Switched Ethernet (AFDX) standard, and/or
non-bounded traffic defined in IEEE 802.3 standard.

8. A real-time computer network for transmitting real-time messages, comprising:
two or more computing nodes (21, 22, 23, 24, 25, 26); and
one or more star couplers (1, 2, 3, 4), wherein the computing nodes (21, 22, 23, 24, 25, 26) are interconnected via at least one star coupler (1, 2, 3, 4), wherein each computing node (21, 22, 23, 24, 25, 26) is connected to at least one star coupler (1, 2, 3, 4) via at least one communication link (50), and wherein the computing nodes are configured to exchange messages (M1, M2) with one another and with the at least one star coupler,
wherein the star couplers are configured such that a star coupler which is synchronized to a global time base (C), transmits a first non-empty set (SSET) of real-time messages according to a synchronized communication paradigm, and/or
wherein the computing nodes (21, 22, 23, 24, 25, 26) are configured such that a computing node which is synchronized to a or the global time base (C) transmits said first non-empty set of real-time (SSET) messages according to a or the synchronized communication paradigm, wherein:
the star couplers are configured such that a star coupler (1, 2, 3, 4), which is not synchronized to a global time base (C), starts the transmission of a second non-empty subset (CSET) of said first non-empty subset (SSET) of real-time messages according to an unsynchronized communication paradigm and stops the transmission of said second non-empty subset (CSET) of real-time messages according to the synchronized communication paradigm, and/or
the computing nodes are configured such that a computing node (21, 22, 23, 24, 25, 26), which is not synchronized to a global time base (C), starts the transmission of a second non-empty subset (CSET) of said first non-empty subset (SSET) of real-time messages according to an or the unsynchronized communication paradigm and stops the transmission of said second non-empty subset (CSET) of real-time messages according to the synchronized communication paradigm.

9. The network according to claim 8, wherein real-time messages are characterized by message types (T), wherein said message types are uniquely identified by unique identifiers, with a unique combination of bits in the header of said real-time message.

10. The network according to claim 9, wherein the star coupler is configured to change the type (T1, T2) of a received message (M1, M2) belonging to said second subset (CSET) of messages to a predefined message types (T20), before transmitting said real-time messages, according to a predefined mapping, if said at least one star coupler is not synchronized to a global time base (C).

11. The network according to claim 10, wherein a unique subset of said predefined message types (T101, T102, T1 . . . n, T201, T202, T2 . . . n, Tk01, Tk02, Tk0n) is assigned to each star coupler, and to each computing node, and wherein each of said star couplers (1, 2, 3, 4) and each of said computing nodes (21, 22, 23, 24, 25, 26), to which a unique subset is assigned is configured to change the type of received messages to said predefined message types (T101, T102, T1 . . . n, T201, T202, T2 . . . n, Tk01, Tk02, Tk0n), according to a predefined mapping (MAP).

12. The network according to claim 11, wherein star couplers and computing nodes have knowledge of said predefined mapping (MAP) for other star couplers in the network (1, 2, 3, 4) and computing nodes (21, 22, 23, 24, 25, 26) and are configured to use this knowledge to detect which star couplers and/or computing nodes have changed the type of the message to one of said types (T101, T102, T1 . . . n, T201, T202, T2 . . . n, Tk01, Tk02, Tk0n) and thus has lost the synchronization to the global time base.

13. The network according to claim 8, wherein the synchronized communication paradigm is realized
using the time-triggered traffic class in TTEthernet standard, in accordance with an IEEE 802.3 standard or a standard based thereon or following on therefrom, and/or
using the IEEE 802.1Qbv standard.

14. The network according to claim 8, wherein the unsynchronized communication paradigm is realized using
IEEE 802.1Qav standard, and/or
using Avionics Full-Duplex Switched Ethernet (AFDX) standard, and/or
using non-bounded traffic defined in IEEE 802.3 standard.

* * * * *